Oct. 27, 1964     J. R. M. ALGER     3,153,924
WASHING MACHINE FILL CONTROL
Filed June 25, 1963     3 Sheets-Sheet 1

INVENTOR.
John R.M. Alger
BY
Andrew F. Hubbard
Atty.

Oct. 27, 1964   J. R. M. ALGER   3,153,924

WASHING MACHINE FILL CONTROL

Filed June 25, 1963   3 Sheets-Sheet 2

INVENTOR.
John R. M. Alger
BY
Andrew H. Hubbard
Atty.

Oct. 27, 1964   J. R. M. ALGER   3,153,924
WASHING MACHINE FILL CONTROL
Filed June 25, 1963   3 Sheets-Sheet 3

FIG. 6

|←—Start         Off—→|

Minimum Fill Operation (Applicable To Figs. 1 & 3 Tub Arrangements)

| Contact | Closed On | Wash Fill | Wash Agitate | Pause | Spin | Pause | Rinse Fill | Rinse Agitate | Pause | Spin |
|---|---|---|---|---|---|---|---|---|---|---|
| 59 | 61 | | | | | | | | | |
| 59 | 78 | ■ | ■ | ■ | ■ | ■ | ■ | ■ | ■ | ■ |
| 62 | | ▨ | | | | | ▨ | | | |
| 64 | 63a | | | ■ | | | | | ■ | |
| 64 | 65 | ▨ | | | | | ▨ | | | |
| 66 | 75 | | | ■ | | | | | ■ | |
| 66 | 68 | ▨ | ■ | | | | ▨ | ■ | | |
| 69a | 70 | ▨ | ■ | | | | ▨ | ■ | | |
| 69a | 76 | | | ■ | | | | | ■ | |
| 71a | 72 | ▨ | | | | | ▨ | | | |
| 71a | 77 | | | ■ | | | | | ■ | |
| 40 | 41 | ■ | | ■ | | ■ | | | | ■ |
| 80 | 81 | ■ | | ■ | | ■ | | | | ■ |
| 80 | 82 | ■ | ■ | | | ■ | ■ | | | |
| 73 | | ■ | | | | ■ | | | | |

FIG. 7

|←—Start         Off—→|

Full Fill Operation (Applicable To Figs. 1 & 3 Tub Arrangements)

| Contact | Closed On | Wash Fill | Wash Agitate | Pause | Spin | Pause | Rinse Fill | Rinse Agitate | Pause | Spin |
|---|---|---|---|---|---|---|---|---|---|---|
| 59 | 61 | ■ | ■ | ■ | ■ | ■ | ■ | ■ | ■ | ■ |
| 59 | 78 | | | | | | | | | |
| 62 | | ■ | | | | | ■ | | | |
| 64 | 63a | | | ■ | | | | | ■ | |
| 64 | 65 | ▨ | ■ | | | | ▨ | ■ | | |
| 66 | 75 | | | ■ | | | | | ■ | |
| 66 | 68 | ▨ | ■ | | | | ▨ | ■ | | |
| 69a | 70 | ▨ | ■ | | | | ▨ | ■ | | |
| 69a | 76 | | | ■ | | | | | ■ | |
| 71a | 72 | ▨ | ■ | | | | ▨ | ■ | | |
| 71a | 77 | | | ■ | | | | | ■ | |
| 40 | 41 | | ■ | | | | | ■ | | |
| 80 | 81 | ■ | | | | ■ | | | | |
| 80 | 82 | ■ | ■ | | | ■ | ■ | | | |
| 73 | | ■ | | | | ■ | | | | |

FIG. 8

Intermediate Fill Operation (For Fig. 5 Circuit and Fig. 3 Tub)

| Contact | Closed On | Wash Fill | Wash Agitate | Pause | Spin | Pause | Rinse Fill | Rinse Agitate | Pause | Spin |
|---|---|---|---|---|---|---|---|---|---|---|
| 59a | 61a | | | | | | | | | |
| 59a | 86 | ■ | ■ | ■ | ■ | ■ | ■ | ■ | ■ | ■ |
| 59a | 78a | | | | | | | | | |

INVENTOR.
John R. M. Alger
BY Andrew S. Hubbard
Atty.

3,153,924
WASHING MACHINE FILL CONTROL
John R. M. Alger, Oak Park, Ill., assignor to General Electric Company, a corporation of New York
Filed June 25, 1963, Ser. No. 290,373
8 Claims. (Cl. 68—12)

This invention relates generally to a washing machine and, more particularly, to a means for controlling the admission of water to a clothes washing machine.

The present invention is particularly applicable to a washing machine having an outer cabinet and a washing tub mounted within the cabinet. In such a washing machine, the outer cabinet is designed to present a pleasant appearance as well as to provide structural rigidity for the machine. The washing tub is designed to contain the clothes during operation of the machine and also to perform various functions such as removing a portion of the water from the clothes by centrifugal force generated by a spinning action of the tub. The washing tub, in such a machine, must be provided with a means for allowing the water to escape from the tub during the spinning action. One means commonly employed is to perforate the tub side wall so that the water is forced therethrough by centrifugal action. Obviously, a perforated tub will not contain the water during the wash and rinse periods. Some washing machines are therefore provided with an imperforate secondary tub within the cabinet such that it surrounds the washing tub to contain the water during wash and rinse periods. The imperforate tub is usually provided with drain means so that during spinning of the washing tub, water which escapes through the washing tub perforations will be removed through the drain. This construction is costly, and except for certain advantages relating to the automatic preselection of the desired water level in the washing tub, is not functionally better than other conventional washing machines which have a substantially imperforate washing tub contained within a watertight cabinet which performs the above-mentioned water collection function of the imperforate secondary tub.

By a "substantially imperforate" washing tub, I mean one which is perforated only near the upper portion of the tub side wall, which is sloped slightly outwardly. In this arrangement, the normal water level during wash and rinse is at approximately the level of the perforations and, since the side wall is sloped outwardly slightly, water will migrate up the side wall during extraction, when the tub is spinning, to escape through the perforations and, since the side wall is sloped outwardly slight- cabinet. A drain is provided in the bulkhead forming the base of the chamber; a discharge pump effects removal of the water to a point of discharge such as a stationary tub or other fixture connected to the plumbing waste line.

It has previously been noted that a commercially acceptable design for a washing machine must provide means to control the amount of water introduced into the washing machine prior to the wash or rinse periods. An adjustably timed admission of water may not produce uniform results, for water pressures vary in the average household, and from one house to the next, and variance in the pressure of the water will result in a variance of the amount of water introduced into the tub. The most practical method of controlling the amount of water is to actually measure the water level in the tub. In the perforated wash tub machines this is easily accomplished by a switch sensitive to water level; the best location for such a switch is in the base of the imperforate secondary tub, for the level in said tub will correspond to the water level in the washing tub. In machines using substantially imperforate tubs, however, water can enter the water collection tub or chamber only by overflow through the openings near the top of the wash tub, and such an arrangement has the obvious disadvantage that it provides no way to operate the washing machine with only a partial fill of water. Since there are many instances when the user of a washing machine desires to wash only a small quantity of clothing, it is highly desirable to provide for automatic partial fill operation in a machine having an essentially imperforate tub.

It is therefore an object of this invention to provide an improved control system for a washing machine.

It is another object of this invention to provide a control system for a washing machine which has provisions for a partial fill operation.

It is a further object of this invention to provide a control system for a washing machine which will provide a partial fill operation with a substantially imperforate washing tub.

Briefly stated, in accordance with one aspect of the invention, a washing machine is provided with a washing tub having in its side wall an upper set of openings and a lower set of openings. The outer cabinet provides a water collection chamber at a low point of which is provided an overflow chamber which receives the water which leaves the tub through either set of openings. As the water entering the washing tub during fill reaches the level of the lower set of openings, water escapes therethrough and collects in the overflow chamber. A switch means at the base of the overflow chamber completes a circuit which closes the fill valve and initiates operation of the washing machine, when a predetermined quantity of water collects in the chamber. This provides for automatic operation in a partial fill. A recirculation pump begins operation immediately on closure of the water level switch, and maintains water circulation between the water collection chamber and the tub. When a full fill condition is selected by the user, the recirculation pump is energized as soon as the user sets the timer dial for the desired washing operation, and thereby immediately returns to the washing tub, any water occupying the overflow chamber. The recirculation pump has a pumping capacity such that it will remove water from the overflow chamber faster than water can escape through the lower set of openings. Therefore, the switch will remain open and the valve will continue to admit water to the tub. As the water level in the tub reaches the upper set of openings, water passes into the collection chamber through both sets of openings. This additional water reaching the overflow chamber exceeds the capacity of the recirculation pump so that water accumulates in the overflow chamber and closes the switch, thereby establishing a circuit which results in closing the valve. As previously, this automatically initiates operation of the washing machine with a washing tub having its maximum content of water.

In a second embodiment, the lower row of tub openings represents the minimum water level in which a washing action of any type should be performed, and the recirculation pump is driven by an adjustable speed motor, or by a constant speed motor with a suitable speed adjustment transmission between the motor and pump. As in the above embodiment, if the pump is not functioning during the fill operation, the tub will fill to just above the lower row of holes, whereupon the fill will terminate and the washing operation commence. If the pump is operating at its maximum pumping rate, full fill will be obtained. At an intermediate pumping rate, the pump will have capacity to remove water at the rate it initially discharges from the lower holes. However, the rate of discharge through these lower holes will increase as the depth of water above the holes increases, and at some predetermined level between the upper and lower rows of holes the reduced capacity of the pump will be unable to prevent the closure of the pressure switch. Closure of the switch will terminate the fill and initiate the washing operation, as presently described in detail.

While the specification concludes with claims particularly pointing out and distinctly claiming the subject matter which is regarded as the invention, the respective embodiments of the invention will be better understood from the following description taken in connection with the accompanying drawings, in which:

FIG. 6 is a cam-chart diagram showing operation of the several switches of the FIG. 4 circuit for the minimum fill operation of the first embodiment;

FIG. 7 is a cam-chart diagram such as FIG. 6, but for a maximum fill condition; and FIG. 8 is the fill selector portion, only, of a cam-chart diagram for intermediate fill selection provided by a second embodiment of the invention.

Figure 1:
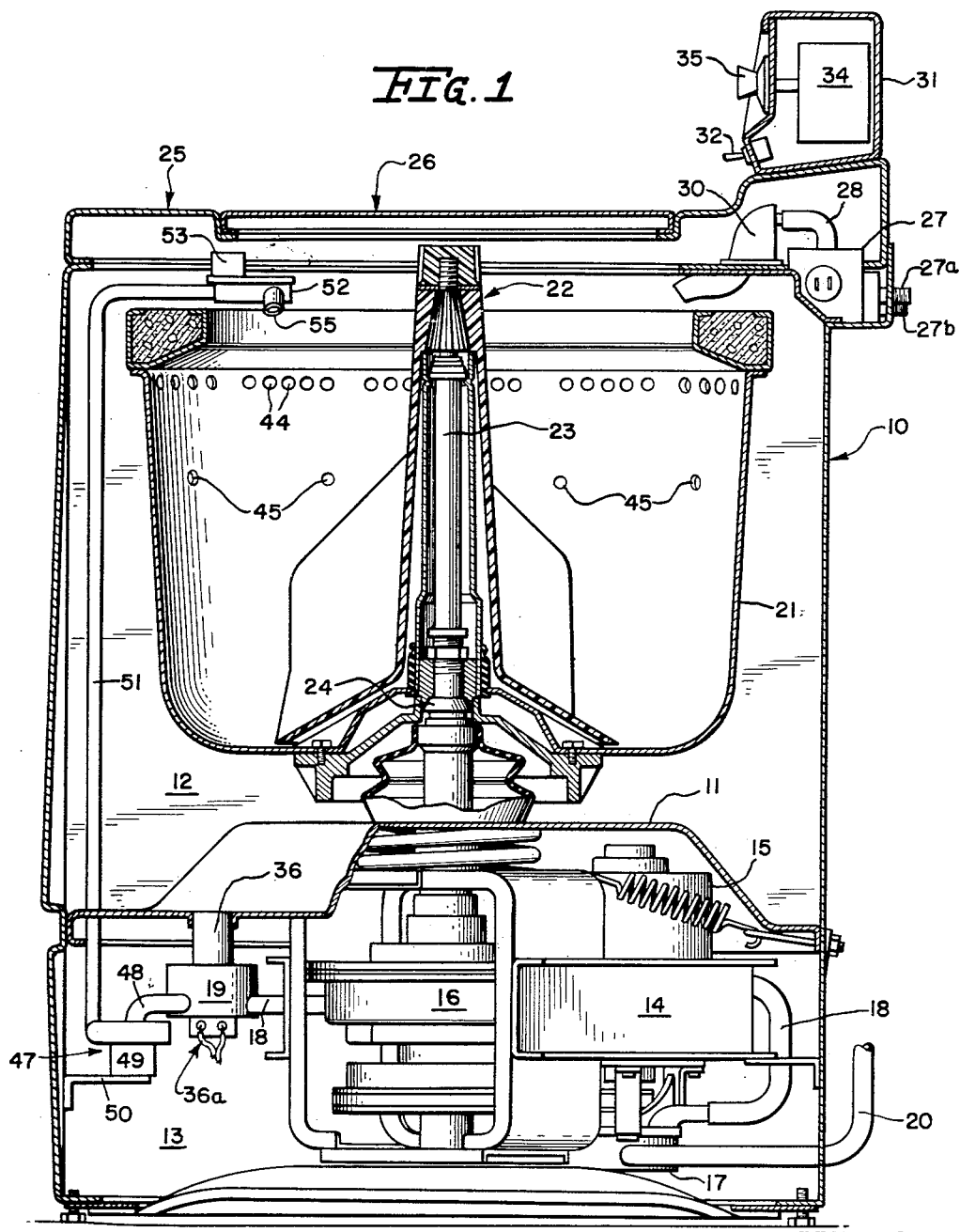
FIG. 1 is a side sectional elevation of a typical clothes washing machine to which the present invention is applicable.

A typical automatic washing machine to which the present invention is applicable comprises, as shown in FIG. 1, an outer casing 10 having a water-tight bulkhead 11 which divides the casing into a water collection chamber 12 and a machinery compartment 13. Suitably supported within the machinery compartment, as by a structure 14, are a main drive motor 15, a transmission 16 and a discharge pump 17. The inlet 18 to the pump 17 communicates with an overflow chamber 19 which is in communication with chamber 12. A discharge hose 20 is arranged to conduct effluent from the pump to a suitable receiver, such as a laundry tub (not shown).

A washing tub 21 is disposed within the water collection chamber 12 and a bladed agitator 22 is disposed within the tub 21. The agitator 22 is fixed to the end of an agitator shaft 23 which is connected to the transmission 16 for oscillation thereby during operation of the motor 15 in one direction of operation, as is well known in the art. The tub itself is mounted on a tubular shaft 24 which also communicates with the transmission 16 and is arranged to be rotated thereby during rotation of the motor 15 in the opposite direction, also as well known in the art. The transmission, the exact drive mechanism, and the means for rotatably supporting the tub 21 may be in all respects conventional and details thereof have been omitted by brevity, since they form no part of the present invention.

The upper part of the casing 10 is enclosed by a cover structure 25 which is provided with a raisable lid 26 which affords access to the tub. The rear portion of the cover structure 25 provides a space for the accommodation of a conventional solenoid-controlled water valve 27 having inlets 27a and 27b arranged to be connected respectively to the hot and the cold water supply piping (not shown). It will be understood that the valve is normally closed, and opens when its solenoid coil 27c (FIG. 4) is energized. The valve 27 has an outlet 28 to which is attached an outflow fitting 30 which discharges water into the tub 21. A backsplash structure 31, mounted on the cover structure 25, houses a water fill selection switch. In one control circuit arrangement said switch may be a single-pole, double-throw switch 32; in another circuit arrangement the switch may be a three-pole switch such as switch 32a, FIG. 5. A conventional time-cycle controller 34 having a setting knob 35, is mounted on the front of the backsplash structure for ready accessibility.

Figure 2:
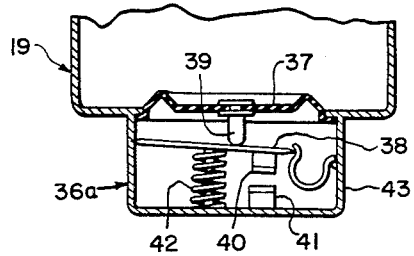
FIG. 2 is a schematic sectional elevation of a water pressure switch.

The overflow chamber 19 communicates with chamber 12 by means of a conduit 36. Any water which enters the water collection chamber 12 drains into the overflow chamber. As best illustrated in FIG. 2, the overflow chamber 19 has a pressure responsive switch 36a comprising a diaphragm 37 which cooperates with a contact carrier 38 through a pin 39. A movable contact 40 is carried by the contact carrier 38 and is adapted to engage affixed contact 41 in response to movement of diaphragm 37. A spring 42 normally biases the contact carrier 38 toward a position where the contacts are separated. A U-shaped spring 43 is provided to afford snap-action for switch operation. With this arrangement, as water rises within the overflow chamber 19 a pressure will be exerted upon the diaphragm 37 and, when a sufficient pressure is achieved, the diaphragm will move the contact carrier 38 through the overthrow point and thereby close the switch.

For the water level control arrangement of FIG. 4, the tub 21 is provided with one set of openings 44 near its upper extremity, and a second set of openings 45 below the first set for establishing the partial fill level. It will be noted that the tub 21 is upwardly and outwardly flared and reaches substantially its maximum diameter at the plane of the openings 44. During the extraction cycle, the tub 21 is rotated and water migrates upwardly along the inner surface of the tub, for ejection into the water collection chamber 12 through the respective sets of openings.

A recirculation pump 47 communicates with the base of the overflow chamber 19 by means of inlet conduit 48. The recirculation pump 47 is driven by a pump motor 49 which is secured to the outer casing 10 by means of bracket 50. The outlet of the recirculation pump 47 is connected to a recirculation conduit 51 which extends upwardly through the water collection chamber 12 and preferably terminates at a lint filter 52 positioned above the tub 21 and secured to the cover structure 25 by means of bracket 53. The lint filter may be of any conventional construction to intercept and retain lint and the like. Water discharging from the lint filter returns to the tub 21 through the outlet 55.

Figure 4:
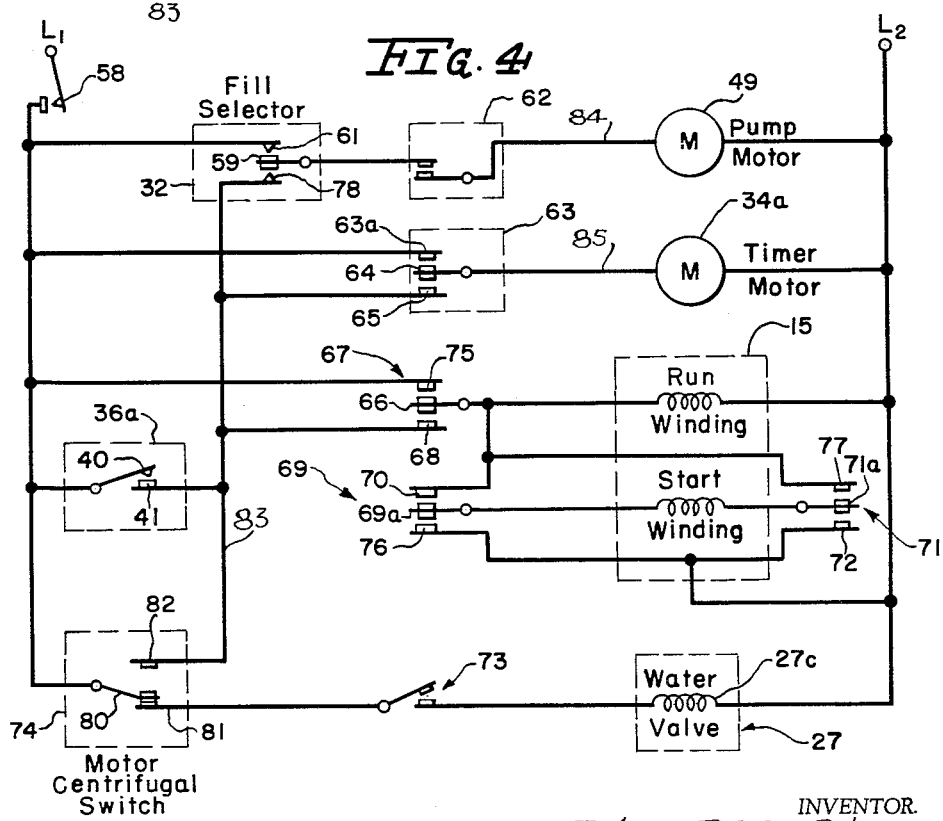
FIG. 4 is a circuit diagram of a control circuit for a first embodiment of the invention.

In accordance with the invention, and as schematically represented in the circuit diagram of FIG. 4, the switch means 32 may be manually set to achieve a partial fill condition, or a full fill condition, of the washing tub 21. In order to avoid burdening the description with operational features not necessary for a complete understanding of the invention, the circuit diagram of FIG. 4 has been reduced to simplest terms, as will become evident as the description continues. A master switch 58, positioned in one of the power lines L1 and L2 and physically located in the time-cycle controller 34, is closed by depressing setting knob 35, this being a conventional feature of time-cycle controllers.

The time-cycle controller 34 is of any conventional type in which a plurality of cams (not shown) are arranged to be rotated by a synchronous motor 34a (FIG. 4) of the well known 'Telechron" type; the cams operate switches between open and closed circuit conditions according to the requirements of the washing and rinsing schedule. In FIG. 4, for example, switch 62 is cam operated between a normally open to a closed circuit condition; switch 63 is cam operated from a normal open position of its switch blade 64 to close either with upper contact 63a or lower contact 65; switch blade 66 of switch 67 is cam operated from normally open to close either with contact 75 or contact 68; blade 69a of switch 69 is cam operated from normally open to close either with contact 70 or contact 76; blade 71a of switch 71 is cam operated from normally open to close either with contact 77 or contact 72; and switch 73 is cam operated between a normally open to a closed circuit condition. The term "normally open" typifies the position of the switches and switch blades at the end of the final operation of the washing machine; as later explained, certain of the switches will operate to a closed position as the user manually rotates the control knob to a start position establishing the desired duration of the washing cycle. Also in FIG. 4, switch 74 is centrifugally operated to cause its switch blade 80 to disengage from contact 81 and engage contact 82 almost immediately after main drive motor 15 begins rotation in either direction.

In the cam charts of FIGS. 6 and 7, the cross-hatched portions represent situations in which the designated contacts are closed, but not conducting current.

The following description of operation for a washing cycle embodying a partial fill condition is referenced to the cam chart of FIG. 6. In preselecting the partial fill condition, the user operates switch 32 so that contact 59 is closed with contact 78. The recirculation pump motor 49, the timer motor, and the main drive motor are therefore not connected to L1 because of the open contacts 40, 41 of pressure switch 36a. The pump motor, timer motor, and main drive motor are pre-conditioned for energization immediately upon the closing of said water pressure switch contacts. The timer knob 35 is set at a desired wash time. As the time-cycle switch is operated from its "off" position, switch 62 is closed, pre-conditioning recirculation pump motor 49. Contact 64 of switch 63 is brought into engagement with contact 65, pre-conditioning the timer motor. Contact 66 of switch 67 is brought into engagement with contact 68, contact 69a of switch 69 is brought into engagement with contact 70, and contact 71a of switch 71 is brought into engagement with contact 72 to pre-condition the main drive motor 15 for operation of the motor in the "wash" direction. Switch 73 is closed upon movement of knob 35 to the start position.

As pointed out above, the circuit diagram has been reduced to the simplest terms, and, as a result, only one solenoid coil, 27c, is shown in water valve 27 whereas in actual practice it may be desirable to have two solenoids, one governing the admission of cold water and one governing the admission of hot water to provide a means to temper the water entering the machine.

The contacts 80 and 81 of motor centrifugal switch 74 are normally closed when the main drive motor is not running. As a result, the water valve 27 is energized upon closing of switch 73 and thereby allows water to enter the tub 21. Water continues to enter tub 21 until it reaches the lower set of openings 45, through which it escapes into the water collection chamber 12 and into the overflow chamber 19. As the water level in the overflow chamber 19 rises, the pressure exerted thereby forces contact 40 of the water pressure switch 36a into engagement with contact 41. This engagement completes the electrical circuit to the recirculation pump motor 49, the timer motor 34a, and the main drive motor 15. The pump motor 49 is energized from L1 through closed switch contacts 40, 41, conductor 83, closed contacts 59, 78, closed switch 62, and conductor 84 to L2. The timer motor circuit is through conductor 83, closed contacts 64, 65 and conductor 85 to L2. The drive motor operates in the wash direction from conductor 83, through closed contacts 66 and 68 in the run winding circuit, and closed contacts 70, 69a and 71a, 72 in the start winding circuit.

The capacity of pump 47 exceeds the rate of flow through openings 45, whereupon the pump quickly evacuates the chamber 19, and the contacts 40, 41, of switch 36a reopen. However, before this switch opening occurs, the centrifugal switch of motor 15 has opened the contacts 80, 81 and closed contacts 80, 82, thus establishing a circuit which maintains operation of the drive motor 15, timer motor 34a, and recirculating pump motor 49. Water valve solenoid 27c is deenergized immediately upon opening contacts 80, 81, and water inflow is terminated. It will be noted from FIG. 6 that the timer actually maintains switch 73 closed for a considerable time after the inlet valve closes. This, of course, insures that the valve will be open for the length of time necessary to fill the tub 21 to the point of overflow through the tub upper openings 44 for a full tub washing operation, as later explained.

As shown in FIG. 6 the timer opens switch 62 upon expiration of the washing time. Also, switch 67 opens contacts 66, 68, to permit the main drive motor 15 to stop. At the same time that it opens switch 67, the timer brings contact 64 into engagement with contact 63a so that the timer motor will remain energized as centrifugal switch 74 restores the circuit at 80, 81. After a pause interval, the timer operates switch 67 to bring contact 66 into engagement with contact 75. Also, switch 69 is timer-operated to close contact 69a on contact 76 and contact 71a is brought into engagement with contact 77. This causes the main drive motor 15 to start up and run in the reverse direction. The mechanism within transmission 16 causes tub 21 to spin, as is well known in the art. The opening of switch 62 had deenergized the recirculation pump motor 49. The discharge pump 17, which is driven directly by main drive motor 15 and is effective when the motor has reversed its direction, pumps water from the overflow chamber 19 out through the discharge hose 20. As the tub 21 spins, water is ejected through openings 44 and 45 into water collection chamber 12 and, from there, into overflow chamber 19. It is obvious that the accumulation of water in chamber 19 may close the contacts 40, 41, but this is of no importance, for the main motor 15 will already have driven the centrifugal switch 74 to reclose contacts 80 and 82.

When the timed spin cycle terminates the timer opens switch 67 at its contacts 66 and 75, thereby deenergizing the main drive motor 15. Contacts 64 and 63a remain closed to maintain timer operation despite the restoration of contacts 80 and 81. After the pause, the timer recloses switch 73 and switch 62. Since switch 73 is closed and the motor centrifugal switch 74 is in its 80, 81 closed position due to the inactive condition of main drive motor 15, water enters tub 21 to initiate the rinse cycle in a manner identical to that discussed above with regard to the wash cycle. The entire rinse cycle is essentially identical to the above-described wash cycle and terminates with a final spin cycle which thereby completes the entire washing operation. The cam-cycle chart shows the switch conditions for the rinse and final spin conditions.

In order to achieve a full fill washing operation, the FIG. 7 cam sequence takes place. The operator of the machine manually operates switch 32 to close contacts 59 and 61, and adjusts setting knob 35 to a position which will accomplish the desired washing operation, and then closes master switch 58. The rotation of setting knob 35 to the desired wash position closes switch 62 to immediately energize recirculation pump motor 49 through the circuit including previously closed contacts 59, 61. Contact 64 of switch 63 is brought into engagement with contact 65 to pre-condition the timer motor for energization upon subsequent closing of water pressure switch 36a. Contact 66 of switch 67 is brought into engagement with contact 68, contact 69a is brought into engagement with contact 70 and contact 71a is brought into engagement with contact 72 to pre-condition main drive motor 15. Switch 73 is closed by the rotation of knob 35. Since motor centrifugal switch 74 is in its normally-closed (80, 81) position, water valve 27 is energized upon the closing of switch 73 and water flows into tub 21. At this stage of full fill operation, the control circuit is in the same condition as in the previously described partial fill operation except that, since switch 60 has contact 59 engaging contact 78, the recirculation pump motor is energized and running.

As the water level in tub 21 reaches the level of openings 45, water escapes into water collection chamber 12 and eventually into overflow chamber 19. However, since recirculation pump motor 49 is energized, the water entering overflow chamber 19 is immediately withdrawn by pump 47 and recirculated through recirculation conduit 51 into tub 21. The capacity of recirculation pump 47 is such that it will handle all of the water escaping from openings 45. The water level in tub 21 therefore continues to rise until it reaches the level of openings 44, whereupon water begins to escape through both sets of openings, 44 and 45. The capacity of recirculation pump 47 is not great enough to handle this amount of water, and water accumulates in overflow chamber 19. The water pressure switch 36a thereupon closes, and timer motor 34 and main drive motor 15 are energized, as shown in the cam-cycle chart, FIG. 7. This begins the washing operation. As previously noted, motor centrifugal switch 74 operates immediately after motor 15 starts closing contact 80 against contact 82 and establishing a circuit in parallel with water pressure switch 36a. Switch 73 remains closed throughout the maximum fill interval, and because the motor 15 does not start until after full fill has been accomplished, contacts 80, 81 maintain the solenoid 27c in energized condition.

The timer motor is energized through switch 63. At the end of the prescribed fill interval, timer 34 opens switch 73, terminating flow of water into tub 21. The contacts 40 and 41 of switch 36a probably remain closed during the wash cycle, but this is unimportant. At the end of the prescribed time for the wash cycle, the timer closes contact 64 against 63a to maintain timer operation, opens switch 67 for a brief interval to permit the motor to stop and then operates switch 67 to bring contact 66 into engagement with contact 75. The timer also brings contact 69a into engagement with contact 76 and brings contact 71a into engagement with contact 77. As described above with reference to the partial fill operation, this switching procedure results in the main drive motor 15 being rotated in the reverse direction which causes tub 21 to spin. The switch 62 is opened by the timer at the same time that the timer opens switch 67 to terminate the wash cycle. As the water is spun out of the tub 21, discharge pump 17 removes it as discussed above with regard to the partial fill cycle.

When the spin cycle terminates at the end of a predetermined time measured by the timer motor, a rinse cycle is initiated which comprises a sequence of events identical to those involved with the partial fill wash cycle.

Figure 3:
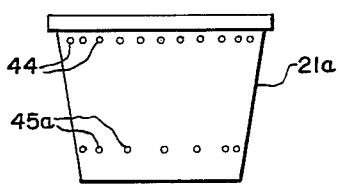
FIG. 3 is a side sectional elevation of a washing machine tub arranged for the practice of a second embodiment of the invention.
Figure 5:
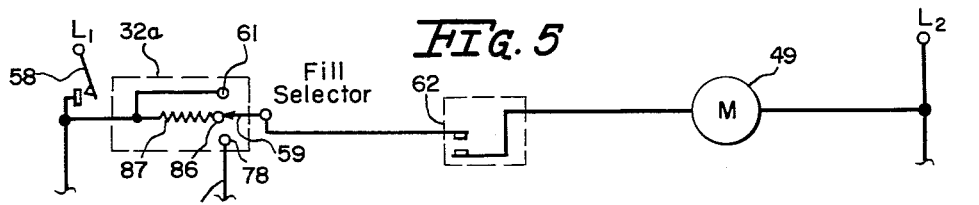
FIG. 5 is the fill selection portion of the circuit of FIG. 4, showing a modification for a second embodiment of the invention.

In a second embodiment of the invention, the tub 21a, FIG. 3, has an upper row of discharge holes 44, as in the tub of FIG. 1, but the lower row of holes 45a is at a lower level than the holes 45 of FIG. 1. Actually, the row of holes 45a is at a level which represents the minimum water level at which any washing operation should be done. The fill selector switch 32a, FIG. 5, is a single-pole, three-position switch rather than the single-pole, two-position switch of FIG. 4. Because for maximum fill selection and minimum fill selection the control circuit is exactly as described with respect to the tub of FIG. 1, the maximum fill contact switch 32a and the minimum fill contact thereof have been given the same identification numbers, namely 61 and 78, as in switch 32 of FIG. 4; likewise, the switch arm contact 59 of switch 32 is shown as this same contact in switch 32a.

Now it will be obvious that when the contact 59 of switch 32a is closed against contact 78, the pump motor 49 cannot start until water flowing out of the tub 21a through the holes 45a has filled the chamber 19 to close contacts 40 and 41 of switch 36a, whereupon the washing machine will operate on a minimum fill level in all respects as above described. It will also be obvious that if contact 59 of switch 32a is closed against contact 61, the motor 49 will start pump 47 immediately, whereupon water flow through the ports 45a has no effect on the switch 36a, which remains in open position until water issues from the upper row of holes 44. The operation of the machine will then proceed under the maximum water level condition, also as previously described.

The circuit of FIG. 5 discloses an intermediate fill selection represented by the contact 86, which places a resistor 87 in the energy circuit of motor pump 49. As in the situation in which the selection is made for maximum fill; the closing of selector switch contact 59 on contact 86 maintains power on motor 49, as shown in the cycle diagram of FIG. 8. The motor 49 remains subject to the overriding control of cam-operated switch 62. However, the interposition of the resistor 87 in the circuit causes the motor to operate at a slower speed and therefore the capacity of pump 47 is reduced.

This reduced capacity provides for an intermediate water level in tub 21a, that is, a water level approximately half way between the openings 44 and 45a. The resistor 87 is sized for a resulting pump motor operation which will withdraw water from chamber 19 at a rate which will exceed the rate of initial flow through openings 45a, but will be inadequate to handle the increased flow through openings 45a resulting from the additional several inches of head pressure as the water level in the tub attains the intermediate fill point. Shortly after the pumping capacity of pump 47 is exceeded, the accumulation of water in chamber 19 will effect the closure of contacts 40 and 41 of switch 36a, and the washing machine operation will proceed similarly to the operations previously described.

The above described invention provides a practical and efficient means for achieving both a full fill and a partial fill operation of a clothes washing machine having a substantially imperforate tub.

As will be evident from the foregoing description, certain aspects of the invention are not limited to the particular details of the construction of the example illustrated, and it is contemplated that various and other modifications or applications will occur to those skilled in the art. It is therefore intended that the appended claims shall cover such modifications and applications as do not depart from the true spirit and scope of the invention.

What is claimed is:

1. A washing machine, comprising:
 (a) a tub to receive water and clothes to be washed therein,
 (b) said tub having a plurality of openings in its side wall at a level establishing a first water fill level,
 (c) means including an electrically operated valve to admit water to said tub,
 (d) electric circuit means including a manually operated switch to energize said valve for flow of water therethrough,
 (e) a chamber adapted to receive water escaping through said tub openings,
 (f) electric circuit means including a switch responsive to a predetermined level of water in said chamber to override said manually operated switch to deenergize said valve,
 (g) a pump to withdraw water from said chamber at a rate greater than the rate of water flow thereinto from said tub openings,
 (h) control means optionally operable to energize said pump from the commencement of a tub filling operation,
 (i) and means effective upon the attainment of a second water level in said tub to establish flow of water into said chamber at a rate beyond said pump capacity, whereby said chamber may accumulate water to the level effecting deenergization of said valve.

2. A washing machine, comprising:
 (a) a tub to receive water and clothes to be washed therein,
 (b) said tub having a first plurality of openings in its side wall to establish a first water fill level and a second plurality of side wall openings to establish a second water fill level, (c) means including an electrically operated valve to admit water to said tub, (d) electric circuit means including a manually operated switch to energize said valve for flow of water therethrough, (e) a chamber adapted to receive water escaping through either of said first and second named tub openings, (f) electric circuit means including a switch responsive to a predetermined level of water in said chamber to override said manually operated switch to deenergize said valve, (g) a pump to withdraw water from said chamber at a rate greater than the rate of water flow thereinto from the first named tub wall openings, (h) an electric circuit including said water level responsive switch to operate said pump upon the attainment of said chamber water level whereby said pump may be energized and said inlet valve deenergized substantially concurrently, (i) and a selection switch in said last named circuit for optionally energizing said pump concurrently with the commencement of water flow into said tub, (j) said first and second sets of tub wall openings cumulatively effecting flow of water into said chamber at a rate beyond the withdrawal capacity of said pump, whereby the valve deenergizing water level in said chamber will not be attained until after said tub has been filled at least to the level of its said second named openings.

3. A washing machine according to claim 1, in which the discharge of said pump communicates with said tub.

4. A washing machine according to claim 1, in which said pump operating circuit includes switching means maintaining operation of said pump for a timed interval following deenergization of said valve.

5. A washing machine comprising:
(a) a tub to receive water and clothes to be washed therein,
(b) said tub having a first set of openings in its side wall near the tub top and a second set of openings in its side wall below said first set,
(c) a valve to control admission of water to said tub,
(d) means for opening said valve,
(e) an overflow chamber adapted to receive water escaping from said tub through said first set and said second set of openings,
(f) electric circuit means including a switch responsive to the amount of water in said overflow chamber to operate said valve to closed condition,
(g) a recirculation pump to discharge water from said overflow chamber and return it to said tub,
(h) said pump having a pumping capacity exceeding the amount of water which can escape through said second set of openings, and
(i) control means having an optional first operating position for energizing said recirculation pump during the time when said tub is being filled to prevent water accumulation in said overflow chamber whereby actuation of said switch means is delayed and full fill of said tub is achieved,
(j) said control means having an optional second operating position preventing energization of said recirculation pump during the time when said tub is being filled to permit accumulation in said overflow chamber of water escaping through said second set of openings whereby said switch means is actuated to achieve partial fill.

6. A washing machine comprising:
(a) a tub to receive water and clothes to be washed therein,
(b) a main drive motor,
(c) said tub having at least one set of openings in its side wall in a plane corresponding to a partial water fill level, (d) electric circuit means including an electrically-operated valve to control admission of water to said tub,
(e) an overflow chamber adapted to receive water escaping from said tub,
(f) means to operate said valve comprising:
(aa) manually operable switch means to energize said valve for flow of water therethrough,
(bb) switch means responsive to the amount of water in said overflow chamber to energize said motor, and
(cc) a switch in said valve operating circuit responsive to the operation of said motor to deenergize said valve,
(g) a recirculation pump to discharge water from said overflow chamber and return it to said tub,
(h) said pump having a pumping capacity exceeding the amount of water which can escape through said set of openings,
(i) control means for energizing said recirculation pump during the time when said tub is being filled to prevent water accumulation in said overflow chamber whereby actuation of said switch means is delayed and full fill of said tub is achieved, and
(j) control means selectively operable to prevent energization of said recirculation pump during the time when said tub is being filled to permit accumulation in said overflow chamber of water escaping through said set of openings whereby said switch means is actuated to achieve partial fill.

7. A washing machine comprising:
(a) a tub to receive water and clothes to be washed therein,
(b) said tub having first and second rows of openings in its side wall, said rows being in planes in which the first row establishes a partial tub fill and the second row establishes a full tub fill,
(c) means including an electrically operated valve to admit water to said tub,
(d) means including a time-cycle controlled switch to energize said valve for flow therethrough for a predetermined maximum time period,
(e) a chamber adapted to receive water escaping through said first and second rows of openings,
(f) mechanism for effecting a washing operation in said tub,
(g) a motor for actuating said mechanism,
(h) switch means in circuit with said motor to control the operation thereof,
(i) means in said chamber for operating said switch means to closed circuit condition in response to a predetermined accumulation of water in said chamber,
(j) switch means operated by said motor only during operation thereof to deenergize said valve to terminate water flow to said tub independently of said time-cycle controlled switch,
(k) a pump for withdrawing water from said chamber at a rate greater than the flow thereinto from said first row of openings but less than the combined rate of flow from each of said rows,
(l) an electric circuit including said water level operated switch means to energize said pump coincidentally with operation of said motor,
(m) an electric circuit including a manually closable switch to energize said pump for operation prior to operation of said water level responsive switch, and
(n) time-cycle controlled switch means effective notwithstanding the closure of said manually operable switch to terminate operation of said pump and said motor.

8. A washing machine comprising:
(a) a tub to receive water and clothes to be washed therein,
(b) said tub having first and second rows of openings in its side wall, said rows being in planes in which the first row establishes a partial tub fill and the second row establishes a full tub fill, (c) means including an electrically operated valve to admit water to said tub, (d) a chamber adapted to receive water escaping through said first and said second rows of openings, (e) mechanism for effecting a washing operation in said tub, (f) a motor for actuating said mechanism, (g) switch means in circuit with said motor to control the operation thereof, (h) means in said chamber for operating said switch means to closed circuit condition in response to a predetermined accumulation of water in said chamber, (i) switch means operable by said motor, said switch means having a first circuit position, when said motor is at rest, to prepare a circuit for energizing said valve and a second circuit position, when said motor is running, to deenergize said valve circuit to terminate water flow to said tub, (j) means for completing said prepared valve circuit, (k) a pump for withdrawing water from said chamber at a rate greater than the flow thereinto from said first row of openings but less than the combined rate of flow from each of said rows, (l) an electric circuit including said water level operated switch means to energize said pump coincidentally with operation of said motor, (m) an electric circuit including a manually closable switch to energize said pump for operation prior to operation of said water level responsive switch, (n) time-cycle controlled switch means effective notwithstanding the closure of said manually operable switch to terminate operation of said pump and said motor, and (o) time-cycle controlled switch means to interrupt said valve energizing circuit regardless of the condition of said first circuit position of said motor operable switch means.

References Cited in the file of this patent
UNITED STATES PATENTS

| | | |
|---|---|---|
| 2,554,229 | Woodson | May 22, 1951 |
| 2,911,811 | Clark | Nov. 10, 1959 |
| 2,934,928 | Shelton | May 3, 1960 |